US012524265B2

(12) United States Patent
Suggs

(10) Patent No.: US 12,524,265 B2
(45) Date of Patent: Jan. 13, 2026

(54) MULTI-CYCLE SCHEDULER WITH SPECULATIVE PICKING OF MICRO-OPERATIONS

(71) Applicant: Advanced Micro Devices, Inc., Santa Clara, CA (US)

(72) Inventor: David N. Suggs, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 476 days.

(21) Appl. No.: 17/559,251

(22) Filed: Dec. 22, 2021

(65) Prior Publication Data

US 2023/0195517 A1 Jun. 22, 2023

(51) Int. Cl.
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | | |
|---|---|---|---|---|
| 5,951,679 A * | 9/1999 | Anderson | ............. | G06F 9/3842 712/E9.058 |
| 6,098,166 A * | 8/2000 | Leibholz | ............... | G06F 9/3824 712/216 |
| 6,334,182 B2 * | 12/2001 | Merchant | ................ | G06F 8/445 712/216 |
| 6,557,095 B1 * | 4/2003 | Henstrom | ............... | G06F 9/384 712/216 |
| 9,727,340 B2 * | 8/2017 | Achenbach | ........... | G06F 9/3836 |
| 10,831,232 B2 * | 11/2020 | Ravi | ...................... | G06F 9/3856 |
| 11,755,731 B2 * | 9/2023 | Favor | .................... | G06F 9/3842 726/22 |
| 2004/0128481 A1 | 7/2004 | Brekelbaum et al. | | |
| 2005/0060518 A1 * | 3/2005 | Augsburg | ............. | G06F 9/3836 712/E9.05 |
| 2008/0005535 A1 * | 1/2008 | Sodani | .................. | G06F 9/3842 712/214 |
| 2012/0023314 A1 * | 1/2012 | Crum | .................... | G06F 9/3838 712/216 |
| 2013/0117543 A1 * | 5/2013 | Venkataramanan | .. | G06F 9/3001 712/E9.016 |

(Continued)

OTHER PUBLICATIONS

Stark et al.; "On Pipelining Dynamic Instruction Scheduling Logic"; 2000 IEEE; Intel Corporation, The University of Texas at Austin; (Stark_2000.pdf; pp. 57-66) (Year: 2000).*

(Continued)

*Primary Examiner* — Hiren P Patel
(74) *Attorney, Agent, or Firm* — FIG. 1 Patents

(57) ABSTRACT

A multi-cycle scheduler for a processor includes early wake circuitry, late wake circuitry, and picker circuitry. In a first cycle of a clock, the early wake circuitry speculatively identifies child micro-operations as ready whose dependencies are satisfied by a set of ready parent micro-operations. In a second cycle of the clock, the picker circuitry picks at least one of the child micro-operations identified as ready for issue to execution circuitry. In addition, the late wake circuitry blocks from issue at least one picked child micro-operation speculatively identified as ready upon determining that a respective parent micro-operation did not issue to execution circuitry.

20 Claims, 5 Drawing Sheets

(56) References Cited

U.S. PATENT DOCUMENTS

| | | | |
|---|---|---|---|
| 2014/0129806 A1* | 5/2014 | Kaplan | G06F 9/3836 |
| | | | 712/E9.016 |
| 2016/0179552 A1* | 6/2016 | Wong | G06F 9/3838 |
| | | | 712/216 |
| 2018/0024934 A1* | 1/2018 | Moyer | G06F 9/3814 |
| | | | 711/118 |

OTHER PUBLICATIONS

Gran et al.; "An Enhancement for a Scheduling Logic Pipelined over two Cycles"; 2006 IEEE; (Gran_2006.pdf, pp. 1-7) (Year: 2006).*

"EP Search Report", EP Application No. 22912213.0, Nov. 25, 2025, 10 pages.

* cited by examiner

MULTI-CYCLE SCHEDULER WITH SPECULATIVE PICKING OF MICRO-OPERATIONS

BACKGROUND

Related Art

In some electronic devices, a processor executes instructions from program code (e.g., applications, operating systems, firmware, etc.) that cause the processor to perform corresponding operations. Before executing some or all of the instructions, which can be called macro-instructions, the processor decodes the instructions into one or more micro-operations (i.e., μops or uops). Each micro-operation is a low-level processor instruction that, when executed by an execution unit the processor, causes the processor to perform a respective part of the operation(s) of the macro-instruction from which the micro-operation was decoded. For example, an ADD macro-instruction may be decoded into a number of micro-operations that cause the processor to perform corresponding parts of the ADD operation (e.g., acquiring data, adding the data together, storing a result, etc.)

In some processors, after decoding micro-operations, a decoding functional block in the processor forwards the micro-operations to a scheduler functional block in the processor that schedules the micro-operations for execution in execution unit(s) in the processor. The scheduler functional block temporarily stores/buffers received micro-operations in scheduler entries until an execution unit is available for executing the micro-operations. The scheduler functional block also ensures that prior micro-operations upon which the micro-operations have dependencies have or will have completed execution by the time that the micro-operations are being executed, so that inputs required for executing the micro-operations are available. In other words, the scheduler functional block ensures that dependencies are resolved for micro-operations before micro-operations are permitted to be picked from scheduler entries to issue to an execution unit for execution. Thus, when these two conditions are met, i.e., when all dependencies for micro-operations have been resolved and an execution unit is available for executing the micro-operations, the micro-operations are "ready," and the scheduler can pick the ready micro-operations from respective scheduler entries for issue to the execution unit. Because there are typically only a relatively small number of execution units, and thus there may be more ready micro-operations than there are execution units, the scheduler functional block has to select from among the ready micro-operations to find micro-operations that are to be picked. The operations for identifying ready micro-operations and picking ready micro-operations to be issued to execution units are complex and time consuming. Schedulers have therefore proven difficult to design for higher-throughput processors.

BRIEF DESCRIPTION OF THE FIGURES

Throughout the figures and the description, like reference numerals refer to the same figure elements.

DETAILED DESCRIPTION

Figure 1:
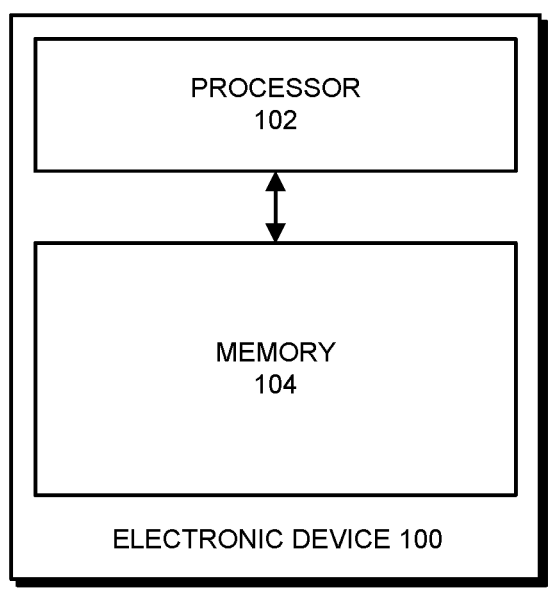
FIG. 1 presents a block diagram illustrating an electronic device in accordance with some implementations.

The following description is presented to enable any person skilled in the art to make and use the described implementations and is provided in the context of a particular application and its requirements. Various modifications to the described implementations will be readily apparent to those skilled in the art, and the general principles described herein may be applied to other implementations and applications. Thus, the described implementations are not limited to the implementations shown, but are to be accorded the widest scope consistent with the principles and features described herein.

In the following description, various terms are used for describing implementations. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some implementations, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

In the described implementations, an electronic device includes a processor with execution units that are used for executing micro-operations decoded from macro-instructions. For example, the execution units can include N integer execution units that are each used for executing integer micro-operations, where N=4, 6, or another number. The electronic device also includes a scheduler that performs operations associated with scheduling micro-operations for execution by the execution units. The scheduler receives micro-operations from upstream circuitry (e.g., decoding circuitry, etc.) and stores each received micro-operation in a respective scheduler entry to await issue for execution until an execution unit is available for executing that micro-operation and all dependencies are resolved for that micro-operation. In other words, the scheduler, along with ensuring that an execution unit will be available for executing each issued micro-operation, ensures that all inputs for each micro-operation are/will be available for executing that micro-operation before determining that that micro-operation is ready for issue to an execution unit. The scheduler includes wake circuitry that performs operations associated with identifying ready micro-operations stored in scheduler entries that are ready to be picked for execution and picker circuitry that performs operations associated with picking ready micro-operations from scheduler entries to be issued to execution units for execution. The scheduler is a two-cycle, or "pipelined," scheduler. Portions of the above-described operations for scheduling micro-operations for execution are therefore performed by the wake circuitry and/or picker circuitry in two consecutive cycles of a controlling clock.

In the described implementations, the scheduler performs operations for speculatively identifying micro-operations as ready to be issued to execution units. The micro-operations speculatively identified as ready can then be picked for issue to execution units in a next clock cycle (i.e., as soon as possible). More specifically, child micro-operations of ready parent micro-operations are speculatively identified as ready to be picked for execution before it is known whether (or not) the ready parent micro-operations were themselves picked for execution. The "speculation" is therefore that all ready parent micro-operations will be picked for execution. This may not be true, because all ready parent applications may not be picked for execution due to the limited number of execution units to which the parent micro-operations can be issued and the fact that there may be many ready parent micro-operations. The scheduler therefore subsequently recovers from incorrect speculation about ready child micro-operations by blocking improperly picked/unready child micro-operations from issuing to execution units for execution. The scheduler, however, permits other picked child micro-operations that were speculatively identified as ready to issue to execution units.

For the above described operations of the scheduler, in a first cycle of the clock, early wake circuitry in the wake circuitry speculatively identifies child micro-operations as ready whose dependencies are satisfied by a set of ready parent micro-operations. The early wake circuitry then generates an early ready signal to the picker circuitry that identifies each scheduler entry where a ready child micro-operation is stored. The early wake circuitry does this before it is known which of the ready parent micro-operations were picked for issue to execution units. In other words, the early wake circuitry speculatively identifies the child micro-operations as ready as if all ready parent micro-operations got picked to be issued to execution units and thus the dependencies for the child micro-operations are/will be resolved, despite the chance that some of the ready parent micro-operations will not get picked. In a second cycle of the clock, the picker circuitry picks child micro-operations from among the child micro-operations that were speculatively identified as ready for issue to execution units. In addition, in the second cycle of the clock, late wake circuitry in the wake circuitry receives an identification of parent micro-operations that were picked for issue (in the first cycle) and, based on the identification, determines child micro-operations that were incorrectly identified as ready by the early wake circuitry. In other words, the late wake circuitry determines ready parent micro-operations that did not get issued for execution—and therefore child micro-operations that were speculatively identified as ready that were not ready due to dependencies on non-issued parent micro-operations. The late wake circuitry then generates a late ready signal that is used by blocking circuitry for blocking from issue picked child micro-operations that were incorrectly speculatively identified as ready, while other picked child micro-operations that were speculatively identified as ready are allowed to issue to the execution units.

In some implementations, the scheduler includes M scheduler entries, each scheduler entry used for storing micro-operations until the micro-operations are ready and can be picked for issue to the execution units (where M=96, 125, or another number). The scheduler also includes a dependency matrix that is used for tracking dependencies between micro-operations stored in scheduler entries. The dependency matrix includes a dependency record for each scheduler entry that includes storage elements for storing information about dependencies of micro-operations stored in that scheduler entry on micro-operations stored in other scheduler entries. The early wake circuitry and late wake circuitry use the dependency matrix for the above described operations for speculatively identifying child micro-operations as ready to be picked for issue to execution units. For example, in some implementations, when generating the late ready signal, the late wake circuitry identifies the ready parent micro-operations by using identifiers for grandparent micro-operations that issued in a prior cycle of the clock to search the dependency record for parent micro-operations whose dependencies are satisfied by the issued grandparent micro-operations. As another example, in some implementations, when generating the early ready signal, the early wake circuitry identifies the ready child micro-operations by using identifiers for the ready parent micro-operations to search the dependency record for child micro-operations whose dependencies are satisfied by the ready parent micro-operations.

In some implementations, the scheduler includes broadcast circuitry that determines and broadcasts identifiers for issued micro-operations (i.e., picked micro-operations that issued to execution units) to other circuitry in the scheduler. For example, in some implementations, the broadcast circuitry is connected to a dedicated signal line for each scheduler entry and asserts the signal line for each scheduler entry from which a picked micro-operation was issued. In these implementations, the broadcast circuitry determines the identifiers for issued micro-operations and communicates the identifiers to the late wake circuitry. The late wake circuitry then uses the identifiers for the issued micro-operations and the dependency matrix to generate a late ready signal that identifies ready child micro-operations of issued micro-operations. The late wake circuitry forwards the late ready signal to the early wake circuitry and the blocking circuitry where the late ready signal is used as described above. In some implementations, the issued signal, late ready signal, and/or early ready signal remain asserted until deasserted, which enables the above described recovery from mis-speculation, etc. That is, individual identifiers within the issued signal, late ready signal, and/or early ready signal are continuously asserted until a change is made.

In some implementations, the picker circuitry picks ready micro-operations for issue to the execution units in age order. In other words, the picker circuitry picks ready micro-operations that have been stored in scheduler entries in order based on the length of time that each micro-operation was stored in a given scheduler entry. For example, assuming that there are N execution units, and thus a maximum of N ready micro-operations can be picked in each cycle, the picker circuitry can pick an oldest ready micro-operation, then a second oldest ready micro-operation, then a third oldest ready micro-operation, etc., until the maximum of N ready micro-operations have been picked. In some of these implementations, the scheduler (or another entity) keeps a record of the relative ages of micro-operations in scheduler entries in an age matrix, which is a dynamically updated data structure that includes information for identifying the ages of micro-operations stored in scheduler entries. Continuing the example from above, when picking the child micro-operations from among the child micro-operations that were speculatively identified as ready for issue to execution units, the picker circuitry picks the child micro-operations in age order.

By pipelining the operations of the scheduler, i.e., distributing the operations of the scheduler across two clock cycles, the described implementations provide more time for the individual scheduler operations without unacceptably reducing the throughput of the scheduler. For example, having the picker operate in the second cycle of the clock enables age based picking—an operation that is difficult to perform in existing single-cycle schedulers. The pipelined scheduler design also enables circuitry in the scheduler (e.g., the dependency matrix, the scheduler entries, etc.) to be scaled up/increased in size or capacity, which enables the scheduler to better handle larger numbers of micro-operations and/or execution units, which is a significant problem for existing single-cycle schedulers. By speculatively marking micro-operations as ready to be picked for issue and then subsequently blocking picked micro-operations that were not ready, the described implementations enable the two-cycle pipelined scheduler to issue micro-operations with single cycle dependencies in consecutive cycles, something that is not possible in other proposed multi-cycle scheduler designs. By improving the operation of the scheduler, which is a bottleneck in existing processor designs, the described implementations can increase the throughput of a processor in which the scheduler is included. Increasing the throughput of the processor improves the performance of the processor, which increases user satisfaction with the processor.

FIG. 1 presents a block diagram illustrating an electronic device 100 in accordance with some implementations. As can be seen in FIG. 1, electronic device 100 includes processor 102 and memory 104. Generally, processor 102 and memory 104 are implemented in hardware, i.e., using corresponding integrated circuitry, discrete circuitry, and/or devices. For example, in some implementations, processor 102 and memory 104 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some implementations, processor 102 and/or memory 104 perform operations for or associated with a two-cycle pipelined scheduler that speculatively sets micro-operations as ready to be picked for issue to execution units as described herein.

Processor 102 is a functional block that performs computational, memory access, control, and/or other operations. For example, processor 102 can be a central processing unit (CPU), a graphics processing unit (GPU), an accelerated processing unit, a system on a chip, a field programmable gate array (FPGA), etc.

Memory 104 is a functional block that stores data for processor 102 (and possibly other functional blocks in electronic device 100 (not shown)). For example, in some implementations, memory 104 is a higher capacity integrated circuit memory (e.g., a "main" memory, etc.) into which copies of data (e.g., 4 kB pages of data) retrieved from a storage device (not shown) are stored for accesses by processor 102. As another example, in some implementations, memory 104 is a high bandwidth memory, which is a higher capacity integrated circuit memory into which copies of data are stored for accesses by processor 102. Memory 104 includes memory circuitry such as fourth generation double data rate synchronous dynamic random-access memory (DDR4 SDRAM) and/or other types of memory circuits, as well as control circuits for handling accesses of the data stored in the memory circuits.

Although electronic device 100 is shown in FIG. 1 with a particular number and arrangement of elements, in some implementations, electronic device 100 includes different numbers and/or arrangements of elements. For example, in some implementations, electronic device 100 includes a different number of processors 102. Electronic device 100 is also simplified for illustrative purposes. In some implementations, however, electronic device 100 includes additional and/or different elements. For example, electronic device 100 can include human interface subsystems (e.g., displays, speakers, keyboards, etc.), electrical power subsystems, input-output (I/O) subsystems, etc. Generally, in the described implementations, electronic device 100 includes sufficient numbers and/or arrangements of elements to perform the operations herein described.

Electronic device 100 can be, or can be included in, any device that performs the operations described herein. For example, electronic device 100 can be, or can be included in, a desktop computer, a laptop computer, a wearable electronic device, a tablet computer, virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some implementations, electronic device 100 is included on one or more semiconductor chips. For example, in some implementations, electronic device 100 is entirely included in a single "system on a chip" (SOC) semiconductor chip, is included on one or more ASICs, etc.

Figure 2:
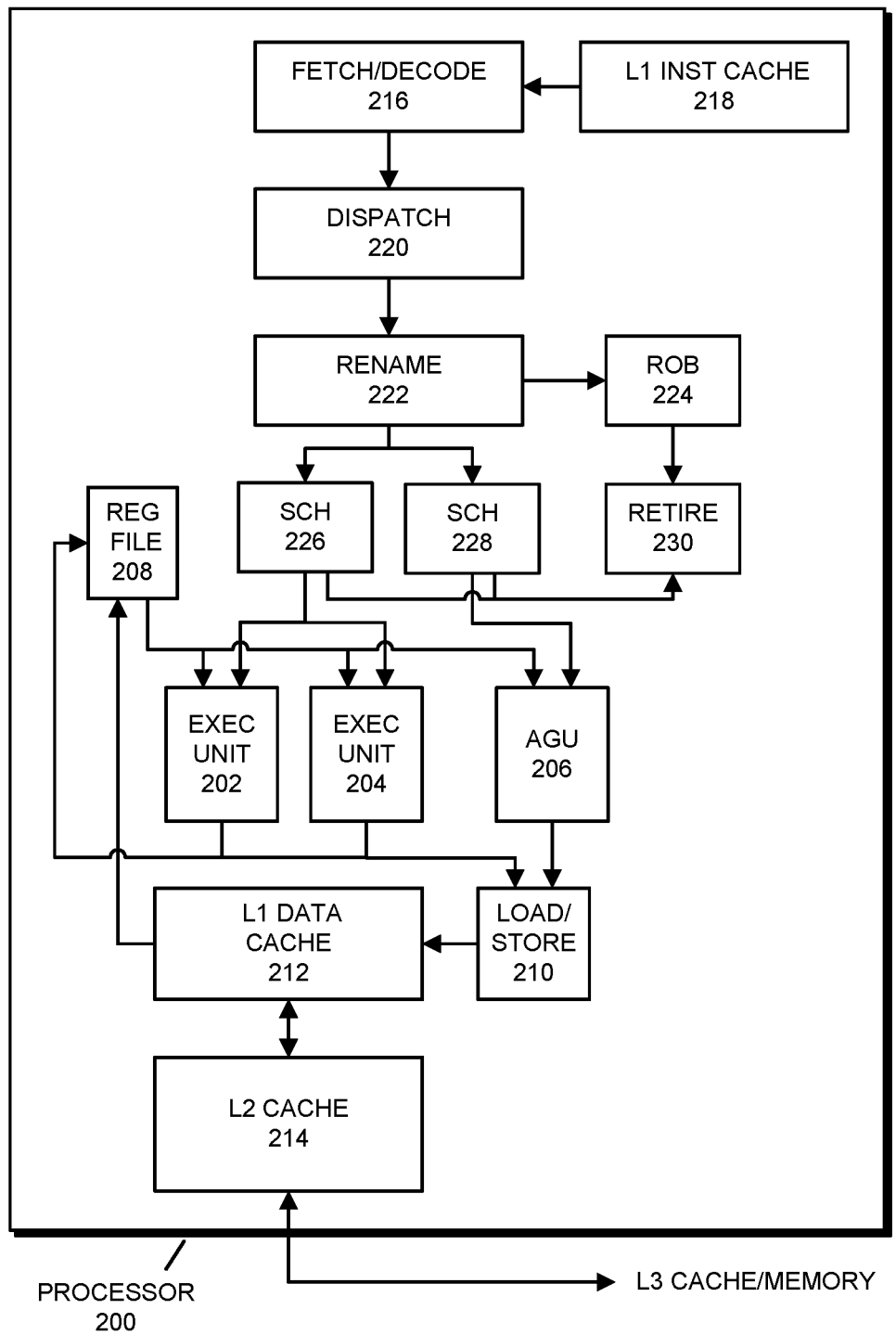
FIG. 2 presents a block diagram illustrating a processor in accordance with some implementations.

In the described implementations, an electronic device includes a processor that performs operations for or associated with a two-cycle pipelined scheduler that speculatively sets micro-operations as ready to be picked for issue as described herein. FIG. 2 presents a block diagram illustrating a processor 200 in accordance with some implementations. In some implementations, processor 102 includes similar elements to those shown in processor 200, i.e., is internally arranged similarly to processor 200.

As can be seen in FIG. 2, processor 200 includes execution (EXEC) units 202-204, each of which is a functional block that includes circuitry for executing micro-operations. For example, each of execution units 202-204 can include execution pipelines, compute units, FPGAs, and/or other micro-operation execution circuitry that executes micro-operations that cause the circuitry to perform corresponding operations. Processor 200 also includes address generation unit (AGU) 206, which is a functional block that performs operations for computing addresses for load and store micro-operations. In some implementations, some or all of execution units 202-204 and address generation unit 206 are arranged for, and possibly dedicated to, executing particular types of micro-operations. For example, in some implementations, execution unit 202 is a simpler integer execution unit that includes circuitry that is arranged for executing simpler micro-operations from among a set of micro-operations supported by processor 200 (e.g., simpler logic micro-operations, simpler mathematical micro-operations, micro-operations that can be executed in only a few cycles of a controlling clock, etc.) and execution unit 204 is a more complex integer execution unit that includes circuitry arranged for executing more complex micro-operations from among a set of micro-operations supported by processor 200 (e.g., more complex logic micro-operations, more complex mathematical micro-operations, micro-operations that need more than a few cycles of a controlling clock to execute, etc.). As another example, in some implementations, execution unit 202 is an integer execution unit that includes circuitry arranged for executing integer micro-operations and execution unit 204 is a floating point execution unit that includes circuitry arranged for executing floating point micro-operations.

Processor 200 also includes register file 208, which is a functional block that includes circuitry for a set of physical registers. Register file 208 includes storage elements (i.e., a number of register file cells, write and read lines/ports, etc.) and access circuitry that is used for storing operands for and results from executing micro-operations in the storage elements. The physical registers in register file 208 are called "physical" registers to distinguish these registers from "architectural" registers, the architectural registers being logical registers included in an instruction set architecture for processor 200.

Processor 200 further includes load/store unit (LOAD/STORE) 210, which is a functional block that includes circuitry for processing loads and stores of data for processor 200. In some implementations, for loading data, load/store unit 210 acquires data from L1 data cache 212—or, if necessary, from L2 cache 214, an L3 cache (not shown), a memory (e.g., memory 104), or a mass storage device (not shown)—and loads/stores the data to physical registers in register file 208. In some implementations, for storing data, load/store unit 210 acquires data from execution units 202-204, physical registers in register file 208, and/or other sources and stores the acquired data in L1 data cache 212 and/or elsewhere (e.g., in L2 cache 214, the L3 cache, the memory, or the mass storage device).

Processor 200 further includes fetch/decode unit (FETCH/DECODE) 216. Fetch/decode unit 216 is a functional block that includes circuitry for fetching program code instructions (or groups thereof) from L1 instruction cache 218 (or elsewhere) and decoding the fetched instructions into micro-operations. In other words, fetch decode unit 216 decodes macroinstructions in program code into micro-operations. After decoding micro-operations, fetch/decode unit 216 sends the micro-operations to dispatch 220. Dispatch 220 is a functional block that includes circuitry for selecting schedulers from among schedulers 226-228 to which micro-operations are to be forwarded in order to be scheduled for execution and dispatching (i.e., forwarding, sending, etc.) the micro-operations to the selected schedulers. As described above, in some implementations, some or all of execution units 202-204 and address generation unit 206 are arranged, and possibly dedicated to, processing particular types of instructions. In some of these implementations, schedulers 226-228 will ordinarily only handle instructions of the type to be processed by the respective execution unit. For example, assuming that address generation unit 206 computes addresses for load and store instructions, scheduler 228, which services execution unit address generation unit 206, will ordinarily only handle load and store micro-operations. In some implementations, therefore, the above-described selecting operation involves dispatch 220 selecting a scheduler that handles each micro-operation based on a type of that micro-operation.

Processor 200 further includes rename unit (RENAME) 222, which is a functional block that includes circuitry for assigning physical registers in register file 208 for storing operands for and/or results from executing micro-operations. Generally, micro-operations initially refer to architectural registers, which are, again, a set of registers in an instruction set architecture for processor 200. The architectural registers referenced by micro-operations are, however, abstract/logical and are normally not directly used for addressing physical registers in processor 200. Instead, the architectural registers referred to by micro-operations are mapped to a set of physical registers in register file 208 by rename unit 222. When a micro-operation refers to (e.g., stores a result to, etc.) a given architectural register, therefore, rename unit 222 selects an allowable and available physical register in register file 208 to be used for the micro-operation and redirects the micro-operation to use that physical register. In some implementations, rename unit 222 includes circuitry for determining dependencies between micro-operations and communicating information about the dependencies to other functional blocks in the processor 200 (e.g., schedulers 226-228, etc.).

Processor 200 further includes reorder buffer (ROB) 224, which is a functional block that includes circuitry that is used for managing out-of-order execution of micro-operations. Generally, processor 200 can execute micro-operations "out of order," i.e., in a different order than the order in which the micro-operations are encountered in program code, as long as the micro-operations are permitted to be executed out of order (i.e., do not have dependencies on one another, are retired in a specified order, etc.). Reorder buffer 224 includes circuitry that is used for, among other things, keeping track of in-flight micro-operations to ensure that micro-operations are retired in the correct order—and therefore are used to update an operating/architectural state (i.e., L1 data cache 212, flags, settings, control values, etc.) of processor 200 in the proper order.

Figure 3:
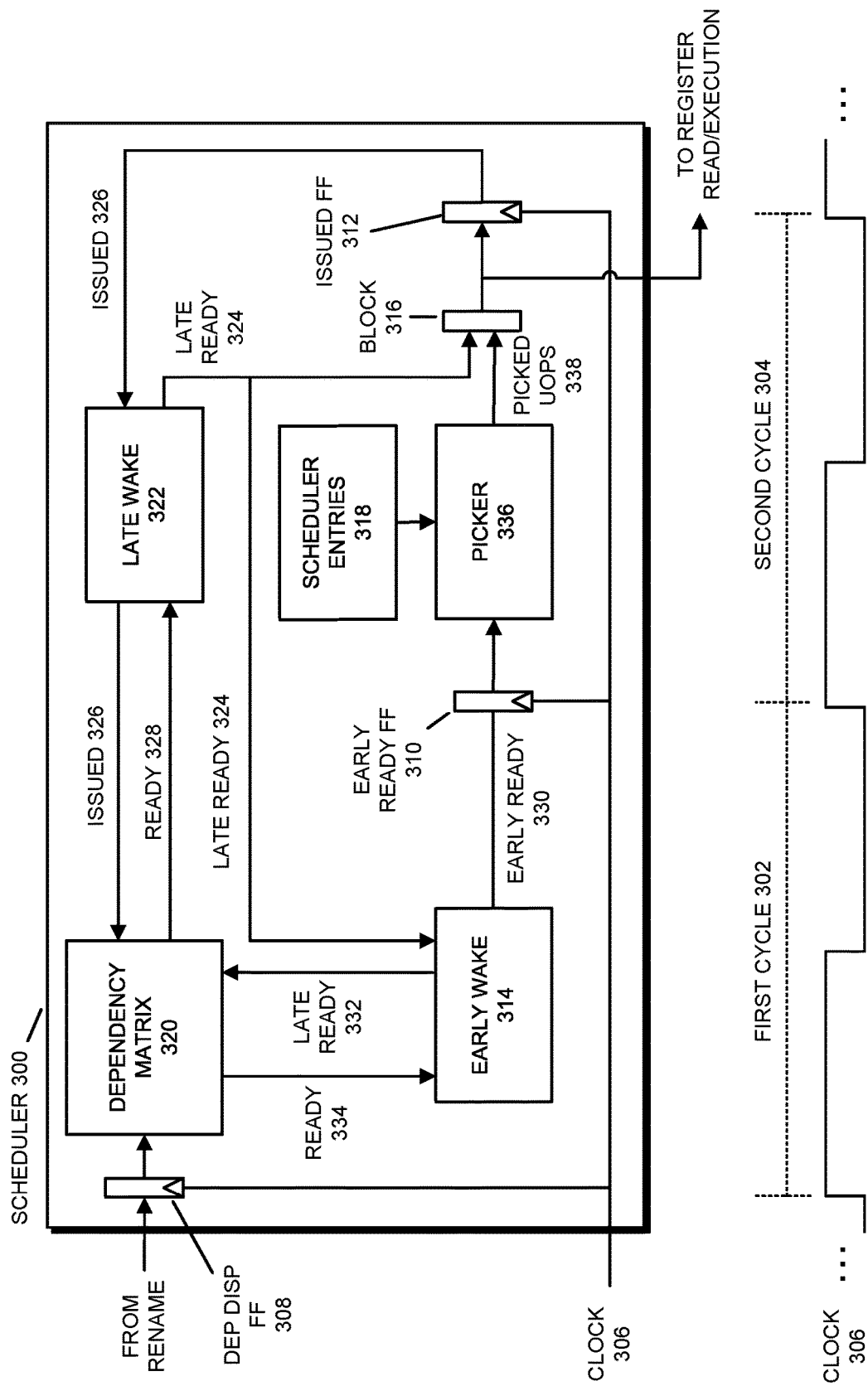
FIG. 3 presents a block diagram illustrating a scheduler in accordance with some implementations.

Processor 200 further includes schedulers (SCH) 226-228, which are functional blocks that include circuitry for scheduling micro-operations for execution in one or more respective execution units. Generally, scheduling the micro-operations includes ensuring that there is an execution unit available/free for executing each of the micro-operations, that prior micro-operations upon which micro-operations depend have, or will have, produced results needed by the micro-operation for execution, etc. In some implementations, scheduler 226 handles the scheduling of micro-operations for execution in execution units 202 and 204, while scheduler 226 handles the scheduling of micro-operations for execution in address generation unit 206. Each of schedulers 226-228 includes scheduler entry circuitry for storing micro-operations awaiting execution (possibly along with other data, such as immediate values, etc.). In some implementations, schedulers 226-228 also includes wake circuitry that determines micro-operations stored in the scheduler entries that are ready to be picked for issue to execution units for execution (i.e., for which dependencies have been resolved), as well as picker circuitry that picks ready micro-operations from the scheduler entries for issue to execution units. In some implementations, one or both of schedulers 226-228 perform operations speculatively identifying micro-operations as ready to be picked for issue to execution units 202-204 or 206, respectively, as described herein. A more detailed example of a scheduler is shown in FIG. 3 and described below.

Processor 200 further includes retire unit (RETIRE) 230, which is a functional block that includes circuitry for receiving, e.g., from schedulers 226-228 and/or other functional blocks, information about micro-operations that have completed execution and committing the micro-operations to an architectural state of processor 200. For example, in some implementations, retire unit 230 interacts with reorder buffer 224 to ensure that completed instructions can safely and correctly be retired, permits instruction results to be committed/written to L1 data cache 212 and/or elsewhere in the memory subsystem, permits processor flags and control values to be set/updated, etc.

Processor 200 is shown in FIG. 2 with various functional blocks in order to provide an example of a processor for the particular functional blocks and operations performed thereby in the described implementations. Processor 200 is, however, simplified for illustrative purposes and for clarity and brevity in describing some implementations. In some implementations, processor 200 includes different functional blocks and/or arrangement of functional blocks than what is shown in FIG. 2. For example, in some implementations, processor 200 includes a different number of execution units and schedulers. As another example, in some implementations, processor 200 includes circuitry such as a program counter and a branch prediction unit that control the flow of instruction fetching. Generally, in the described implementations, processor 200 includes sufficient functional blocks to perform the operations described herein.

In the described implementations, a processor includes a two-cycle pipelined scheduler that performs operations for or associated with speculatively identifying micro-operations as ready to be picked for issue to execution units. FIG. 3 presents a block diagram illustrating a scheduler 300 in accordance with some implementations. In some implementations, one or both of scheduler 226 and scheduler 228 include similar elements to those shown in scheduler 300, i.e., are internally arranged similarly to scheduler 300. In some implementations, some or all of the elements shown in FIG. 3 are implemented in hardware, i.e., using circuitry (e.g., logic gates, storage elements, and/or other integrated circuitry, discrete circuitry, and/or devices) that is configured to perform the described operations. For example, blocking circuitry (BLOCK) 316 includes circuitry that is configured to block certain micro-operations from issuing to execution units while allowing other micro-operations to issue to execution units based on late ready signal 324.

For the example in FIG. 3, two clock cycles, i.e., first cycle 302 and second cycle 304, are shown at the bottom of FIG. 3. These clock cycles represent a sequence of two consecutive clock cycles of clock 306 during which circuitry/functional blocks in scheduler performs respective operations. Each of dependency dispatch flip-flop (DEP DISP FF) 308, early ready flip-flop (EARLY READY FF) 310, and issued flip-flop (ISSUED FF) 312 are rising edge flip-flops that capture data provided by upstream circuitry on a rising edge of clock 306. For example, early ready flip-flop 310 captures data output by early wake circuitry (EARLY WAKE) 314 on the rising edge of clock 306 at the end of first cycle 302. In this way, the operations of some or all of the circuitry shown "between" the flip-flops is performed within a single cycle of clock 306, such as early wake circuitry 314 performing its operations between the rising edge of clock 306 at the start of first cycle 302 and the rising edge of clock 306 at the end of first cycle 302. Scheduler 300 is therefore "pipelined," in that the complete operations of scheduler 300 for scheduling micro-operations are divided up and performed in two consecutive cycles of clock 306.

As can be seen in FIG. 3, scheduler 300 includes scheduler entries 318, which is a functional block that includes circuitry for M scheduler entries (M=96, 125, or another number). Each scheduler entry includes a memory circuitry for storing micro-operations awaiting issue to execution units for execution, as well as access circuitry for accessing the micro-operations stored in that scheduler entry. In some implementations, scheduler entries also include memory circuitry for storing other data, such as immediate values for micro-operations, metadata, etc. Micro-operations are received from upstream circuitry such as rename unit 222 (not shown) and stored in scheduler entries until the micro-operations are "ready," i.e., until all input operands for the micro-operations are and/or will be available by the time that the micro-operation is executed, processor state is and/or will be prepared for executing the micro-operations, etc. When a micro-operation is ready and an execution unit (e.g., execution unit 202) is available for executing the micro-operation, the micro-operation can be picked (i.e., retrieved, acquired, etc.) from the scheduler entry and issued to the execution unit for execution.

During operation, at or before the start of the first clock cycle, a set of micro-operations (not shown) are forwarded from a rename unit (e.g., rename unit 222) and stored in scheduler entries 318. In addition, dependency dispatch flip-flop 308 captures (i.e., stores, retains, etc.) dependency information for the micro-operations forwarded from the rename unit. The dependency information is provided via dependency dispatch flip-flop 308 to dependency matrix 320, where the dependency information is added to existing dependency information in dependency matrix 320. Generally, the dependency information identifies dependencies between micro-operations stored in scheduler entries 318. The dependency information received from the rename unit is arranged in a format that enables the information to be used for updating dependency records in the dependency matrix, such as by including a dedicated signal line for every dependency combination for the micro-operations being stored in scheduler entries 318. For example, if there are ninety six scheduler entries and the set of micro-operations includes six micro-operations, the dependency information can be transmitted via 96×6 signal lines (i.e., 576 signal lines, each signal line indicating a dependency on a respective scheduler entry).

Figure 4:
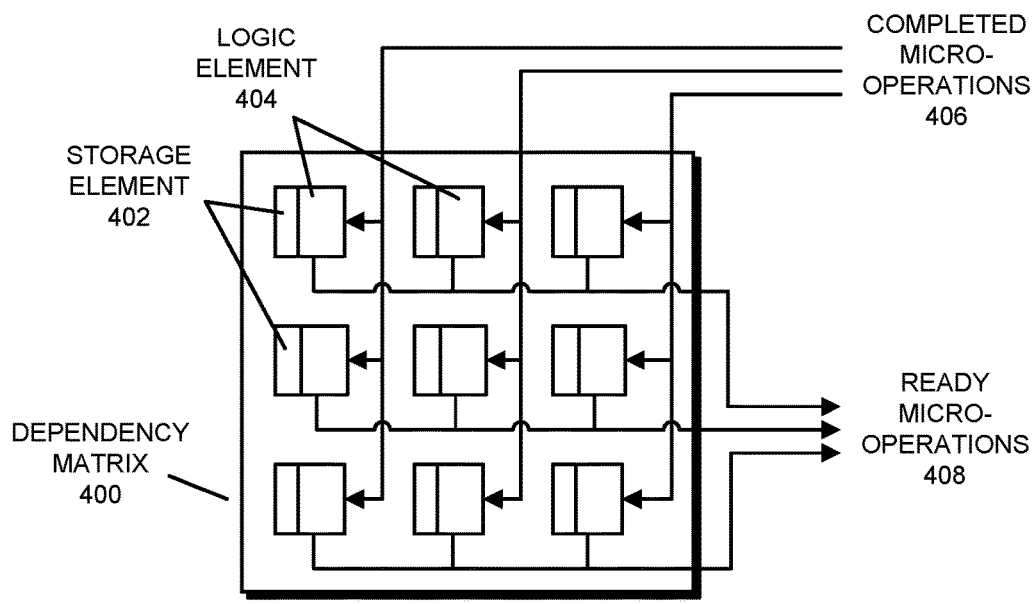
FIG. 4 presents a block diagram illustrating a dependency matrix in accordance with some implementations.

FIG. 4 presents a block diagram illustrating a dependency matrix 400 in accordance with some implementations. In some implementations, dependency matrix 320 is internally organized similarly to dependency matrix 400. As can be seen in FIG. 4, dependency matrix 400 includes a number of rows of storage elements 402, each of which is shown via a box and only a few of which are shown (and labeled) for clarity. Each row is associated with a respective scheduler entry and includes sufficient storage elements to identify a dependency of micro-operations stored in that scheduler entry on micro-operations stored each other scheduler entry in scheduler entries 318. For example, if scheduler entries 318 includes ninety six scheduler entries, dependency matrix 400 includes a 96×96 array of storage elements having ninety six rows with ninety six storage elements, each storage element storing a value that indicates whether (or not) a micro-operations stored in the respective scheduler entry has a dependency on a micro-operation stored in a corresponding other scheduler entry. The elements for updating dependency information are omitted for clarity in FIG. 4, but include circuitry for receiving dependency information and updating the storage elements 402 to indicate whether (or not) a micro-operation stored in a given scheduler entry has a dependency on micro-operation(s) stored in other scheduler entry(ies). Each storage element 402 is associated with a logic element 404 that includes circuitry (e.g., logic gates, etc.) to be used for determining whether (or not) a micro-operation stored in a respective scheduler entry is ready to be picked for issue to an execution unit. Only a few logic elements 404 are labeled in FIG. 4 for clarity. Completed micro-operation signal lines (COMPLETED MICRO-OPERATIONS) 406 are input signal lines to dependency matrix 400 that identify scheduler entries from which micro-operations have completed execution—and thus for which results are available for micro-operations stored in other scheduler entries (or at least have issued—and thus for which results will be available by the time that the micro-operations stored in the other scheduler entries issue). In some implementations, upon completing execution of a micro-operation, the corresponding completed micro-operation signal line 406 is asserted (e.g., by picker circuitry via blocking circuitry 316 and issued flip-flop 312) and remains asserted until all dependent micro-operations are removed from dependency matrix 400. Ready micro-operation signal lines (READY) 408 are output signal lines from dependency matrix 400 that identify scheduler entries that store micro-operations for which all dependencies have been resolved (due to the completion of one or more other micro-operations) and therefore for which the stored micro-operation is ready to be picked for issue to an execution unit.

Returning to FIG. 3, in first cycle 302 of clock 306, late wake circuitry 322 generates late ready signal (LATE READY) 324. Late ready signal 324 is a signal that identifies micro-operations that are ready to be picked for issue to execution units based on micro-operations that issued in a prior cycle of the clock (i.e., in the zeroth cycle of the clock). Late wake circuitry 322 generates late ready signal 324 by forwarding issued signal (ISSUED) 326 to dependency matrix 320, which outputs ready signal (READY) 328. More specifically, dependency matrix 320 generates ready signal 328 by feeding issued signal 326 to logic elements (e.g., logic elements 404), which generate ready signal 328 to identify scheduler entries that store micro-operations that are ready for issue to execution units. Late wake circuitry 322 then forwards ready signal 328, as late ready signal 324, to early wake circuitry 314. Early wake circuitry 314 next generates early ready signal (EARLY READY) 330 based on late ready signal 324. Early wake circuitry 314 generates early ready signal 330 by forwarding late ready signal 324, as late ready signal (LATE READY) 332, to dependency matrix 320, which outputs ready signal (READY) 334. More specifically, dependency matrix 320 generates ready signal 334 by feeding late ready signal 332 to logic elements (e.g., logic elements 404), which generate ready signal 334. Ready signal 334 identifies scheduler entries for which micro-operations will be ready if all of the micro-operations stored in the scheduler entries identified as ready in late ready signal 332 are picked for execution. Because there may be more scheduler entries identified as ready in late ready signal 332 than there are execution units, some of the micro-operations stored in the scheduler entries identified as ready in late ready signal 332 may not be picked. The identification of scheduler entries for which micro-operations will be ready in ready signal 334 is therefore speculative (i.e., is not guaranteed to occur). In other words, early ready signal 330 speculatively identifies child micro-operations as ready for picking based on parent micro-operations that are ready, but for which it is as-yet unknown whether/which of the parent micro-operations will be picked. At the end of first cycle 302 of clock 306, early ready signal 330 is captured in early ready flip-flop 310.

In second cycle 304 of clock 306, early ready signal 330 is provided by early ready flip-flop 310 to picker circuitry 336. In other words, the micro-operations speculatively identified as ready (i.e., the scheduler entries in which these micro-operations are stored) are provided to picker circuitry 336 so that picker circuitry 336 can pick from among the micro-operations speculatively identified as ready for issue to execution unit(s). Picker circuitry 336 then picks from among the micro-operations speculatively identified as ready for issue to execution unit(s). In some implementations, for this operation, picker circuitry 336 picks ready micro-operations in age order, with an oldest ready micro-operation being picked first and subsequent ready micro-operations being picked in age order. Picker circuitry 336 then forwards the picked micro-operations (PICKED UOPS) 338 to blocking circuitry 316. Blocking circuitry 316 receives picked micro-operations 338 and late ready signal 324, which identifies micro-operations that are ready to be picked for issue to execution units based on micro-operations that issued in a prior cycle of the clock (i.e., in the first cycle of the clock, recalling that these operations occur the second cycle of the clock). Late ready signal 324 therefore positively identifies which of the parent micro-operations of the picked micro-operations, i.e., child micro-operations, speculatively identified as ready ended up being picked for issue to execution units. This resolves the speculation from first cycle 302 by identifying ready parent micro-operations that were picked for issue (recall that not all ready parent micro-operations are guaranteed to be picked for issue). Blocking circuitry 316 then blocks from issue picked micro-operations that were speculatively identified as ready but were not ready, which resolves mis-speculation. Blocking circuitry 316, however, permits remaining picked micro-operations to be issued to execution circuitry. Upon issuance, the remaining micro-operations proceed to downstream circuitry for processing and execution (i.e., "TO REGISTER READ/EXECUTION"). At the end of second cycle 304 of clock 306, picked micro-operations 338 (e.g., identifiers for scheduler entries for the issued micro-operations) is captured in issued flip-flop 312. As described above, from issued flip-flop 312, the issued signal 326 is forwarded to late wake circuitry 322 to generate the next late ready signal 324.

Figure 5:
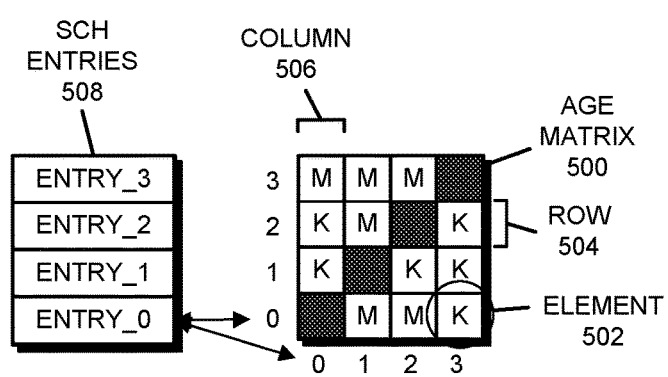
FIG. 5 presents a block diagram illustrating an age matrix in accordance with some implementations.
Figure 6:
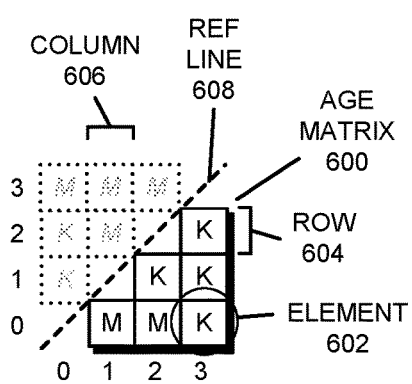
FIG. 6 presents a block diagram illustrating a reduced form of an age matrix in accordance with some implementations.

In some implementations, picker circuitry (e.g., picker circuitry 336) picks micro-operations for issue to execution units in an age order. For example, in some implementations, the picker circuitry picks micro-operations for issue to execution units in order from an oldest ready micro-operation to newer micro-operations in age order. In some of these implementations, the picker circuitry uses an age matrix for picking micro-operations in an age order. Generally, an age matrix is a data structure that includes information to be used for identifying relative ages of items stored in scheduler entries. FIG. 5 presents a block diagram illustrating an age matrix 500 in accordance with some implementations. FIG. 6 presents a block diagram illustrating a reduced form of age matrix 600 in accordance with some implementations. For the example in FIGS. 5-6, Ms and Ks are used as value placeholders in elements of age matrices 500 and 600 for illustrative purposes, but have no specific meaning. The values of bits and interpretation of relative age information in age matrices 500 and 600 is described in more detail below.

As can be seen in FIG. 5, age matrix 500 includes a number of elements 502 arranged in rows 504 and columns 506 (only a few of which are marked in FIG. 5 for clarity). The elements in each row and column are associated with a different scheduler entry and are used for storing age information for an associated scheduler entry (i.e., for a micro-operation stored in the associated entry). For example, the bottommost row and leftmost column in age matrix 500 are associated with the scheduler entry "entry_0." The bottommost row and leftmost column in age matrix 500 therefore store age information relating to the micro-operation stored in entry_0. Note that the diagonal row in age matrix 500, which would hold values that represent the relative ages of micro-operations stored in the same scheduler entries, is of no practical use and is therefore shown in black. In some implementations, the age information is stored in each element using a specified number of bits. For example, in some implementations, age information is stored in each element in age matrix 500 using two bits, with 00 representing younger items, 11 representing older items, and 10 or 01 representing unset or invalid elements (or being invalid values). In these implementations, the scheduler entry that includes the oldest micro-operation is determined based on the column that includes no 11s (and possibly all 00s).

Age matrix 500 as shown in FIG. 5 is an example of a particular arrangement of data for an age matrix, but in some implementations, age matrices store data in one or more different arrangements, including arrangements that are not as easily read (e.g., a list, a table, etc.), but that otherwise represent what is shown in FIG. 5. A reduced form of age matrix 500, age matrix 600, is shown in FIG. 6 in accordance with some implementations. As with age matrix 500, age matrix 600 includes elements 602 arranged in rows 604 and columns 606 (only a few of which are marked in FIG. 6 for clarity). Unlike age matrix 500, however, age matrix 600 lacks elements in rows and columns above reflecting (REF) line 608. This is because the values that would be stored in such elements of age matrix 600 can be determined by reflecting and swapping the values in the elements that are present in age matrix 600 (for this example, M is the swap of K and vice versa). This is shown in FIG. 6 using dotted lines and italicized letters (which are similar in value to those in the corresponding elements of age matrix 500). In other words, given the information in elements on one side of reflecting line 608, the values that would be stored in elements on the other side of the reflecting line can be computed. For this reason, in some implementations, the reduced age matrix 600 is used instead of age matrix 500. Generally, in the described implementations, any arrangement of values can be stored in an age matrix having a respective set of rows and columns (or the equivalent) and used to determine the relative ages of scheduler entries.

Figure 7:
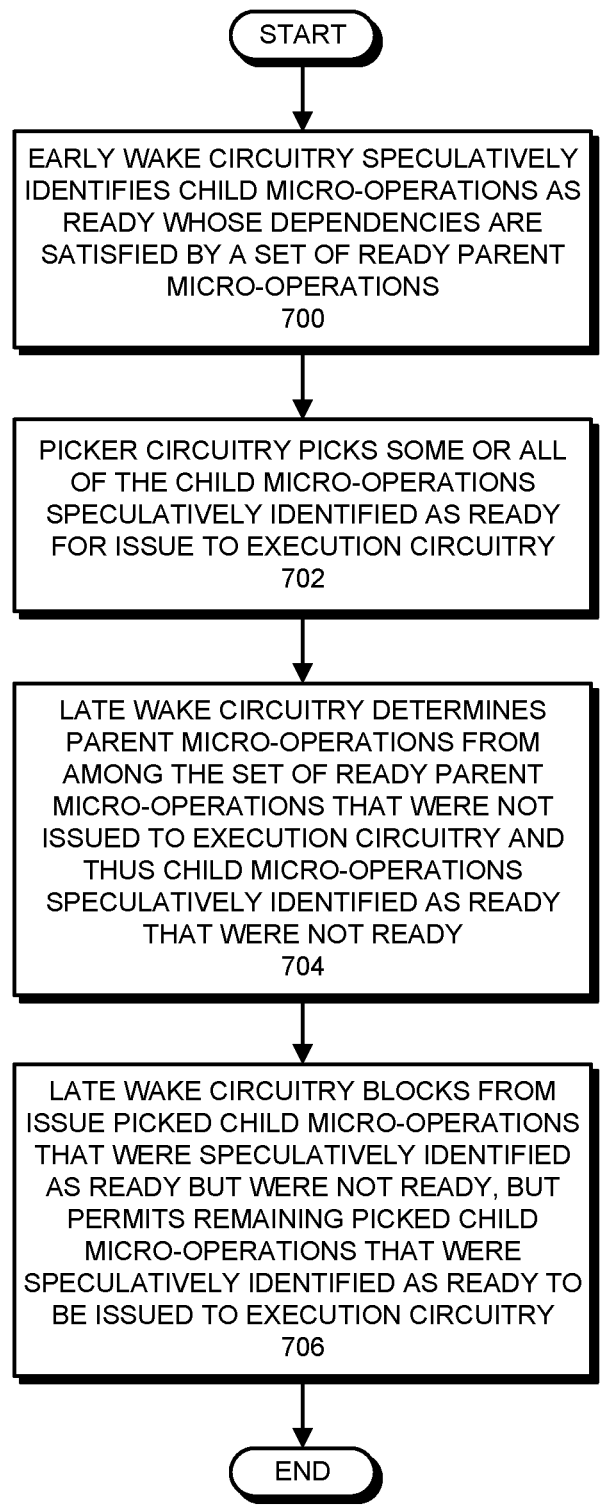
FIG. 7 presents a flowchart illustrating a process for speculatively identifying micro-operations as ready to be picked for execution in accordance with some implementations.

In the described implementations, a multi-cycle scheduler performs operations for speculatively identifying micro-operations as ready to be picked for issue to execution units. FIG. 7 presents a flowchart illustrating a process for speculatively identifying micro-operations as ready to be picked for issue to execution units in accordance with some implementations. FIG. 7 is presented as a general example of operations performed in some implementations. In other implementations, however, different operations are performed and/or operations are performed in a different order. Additionally, although certain elements are used in describing the process (e.g., early wake circuitry, etc.), in some implementations, other elements perform the operations.

As can be seen in FIG. 7, the process starts when early wake circuitry (e.g., early wake circuitry 314) speculatively identifies child micro-operations as ready whose dependencies are satisfied by a set of ready parent micro-operations (step 700). For this operation, the early wake circuitry determines a set of ready parent micro-operations, such as by receiving a late ready signal (e.g., late ready signal 324) that identifies the ready parent micro-operations based on micro-operations (i.e., grandparent micro-operations) that previously issued. The early wake circuitry then identifies as ready for issue child micro-operations with dependencies that are satisfied by the ready parent micro-operations. As described above, in some implementations, this involves the early wake circuitry using a dependency matrix to determine the ready child micro-operations based on the ready parent micro-operations. Note that the ready parent micro-operations have been or will be picked for issue is not known at this time (the parent ready micro-operations will themselves be picked later in the first cycle). The child micro-operations are therefore speculatively identified as ready assuming that the all of the ready parent micro-operations are picked and issue for execution. As described below, a mis-speculation in step 700, i.e., an identification of a child micro-operation as ready that turns out to be incorrect given that one or more ready parent micro-operations are not picked, is subsequently corrected.

For step 700, the dependencies for each of the child micro-operations are "satisfied" by the ready parent micro-operations in that each of the ready parent micro-operations, when executed, will cause an execution unit to generate a result (or otherwise update processor state) that is needed as an input (or otherwise) by one or more of the child micro-operations. In some cases, some or all of the child micro-operations have dependencies on one or more previously issued micro-operations in addition to one or more of the ready parent micro-operations, but the one or more ready parent micro-operations produce the final result(s) (or other processor state update(s)) needed by these child micro-operations in order for the child micro-operations to be ready for execution—and therefore the parent micro-operations "satisfy" the dependency of the child micro-operation.

Picker circuitry (e.g., picker circuitry 336) then picks some or all of the child micro-operations speculatively identified as ready for issue to execution circuitry (step 702). For this operation, the early wake circuitry communicates an identification of the child micro-operations speculatively identified as ready (e.g., scheduler entry identifiers, etc.) to the picker circuitry and the picker circuitry picks from among the ready child micro-operations for issue to execution units. In some implementations, the picker circuitry picks the ready child micro-operations by age, with older child micro-operations being picked first (e.g., with the picker circuitry using an age matrix or other identifier for relative micro-operation age to determine the relative ages of the micro-operations). Note that, for this operation, the picker circuitry may pick less than all of the ready child micro-operations, as there may be more ready child micro-operations than there are execution units. In some cases, the child micro-operations speculatively identified as ready are included with other ready micro-operations (i.e., ready micro-operations that are/were ready in prior cycles, but not picked due to an overabundance of ready micro-operations in the prior cycles, etc.). In these implementations, due to age-based picking, older ready micro-operations will be picked before the ready child micro-operations—and none of the ready child micro-operations may be picked. For the example, in FIG. 7, however, it is assumed that there are no other/prior ready micro-operations awaiting picking and therefore some or all of the ready child micro-operations are picked.

Late wake circuitry (e.g., late wake circuitry 322) then determines parent micro-operations from among the set of ready parent micro-operations that were not issued to execution units—and thus child micro-operations speculatively identified as ready that were not ready (step 704). For this operation, the late wake circuitry receives an identification of ready parent micro-operations that issued in a prior cycle of the clock (e.g., issued signal 326). The late wake circuitry then determines, using dependency matrix, the child micro-operations that were speculatively identified as ready in step 700 that turned out not to be ready because the respective parent application was not picked for issue. In this way, as described above, the late wake circuitry determines misspeculation regarding the readiness of the individual child micro-operations.

The late wake circuitry then blocks from issue picked child micro-operations that were speculatively identified as ready but were not ready, but permits remaining picked child micro-operations that were speculatively identified as ready to be issued to execution circuitry (step 706). For this operation, the late wake circuitry communicates an identification of the ready child micro-operations (e.g., late ready signal 324) to blocking circuitry (e.g., blocking circuitry 316) and the blocking circuitry prevents picked but not ready micro-operations from issuing to execution units. This can include discarding the picked but not ready micro-operations or performing more complex operations to handle the picked but not ready micro-operations. The blocking circuitry, based on the identification communicated from the late wake circuitry, allows picked micro-operations that were ready to issue to execution units, thereby allowing these micro-operations to proceed in execution. Although the blocked micro-operations are blocked, the blocked micro-operations are eventually picked for execution following the issue of their parent applications to execution units for execution.

In some implementations, at least one electronic device (e.g., electronic device 100, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some implementations, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some implementations, the hardware modules include general purpose circuitry such as execution pipelines, compute or processing units, etc. that, upon executing instructions (e.g., program code, firmware, etc.), performs the operations. In some implementations, the hardware modules include purpose-specific or dedicated circuitry that performs the operations "in hardware" and without executing instructions.

In some implementations, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some implementations.

The foregoing descriptions of implementations have been presented only for purposes of illustration and description.

They are not intended to be exhaustive or to limit the implementations to the forms disclosed. Accordingly, many modifications and variations will be apparent to practitioners skilled in the art. Additionally, the above disclosure is not intended to limit the implementations. The scope of the implementations is defined by the appended claims.

What is claimed is:

1. A scheduler for a processor, comprising:
   early wake circuitry;
   late wake circuitry;
   picker circuitry;
   blocking circuitry; wherein:
   in a first cycle of a clock:
      the early wake circuitry speculatively identifies child micro-operations as ready whose dependencies are satisfied by a set of ready parent micro-operations which are ready to issue to execution circuitry; and
   in a second cycle of the clock:
      the picker circuitry picks at least one of the child micro-operations speculatively identified as ready for issue to execution circuitry;
      the late wake circuitry generates an updated late ready signal that identifies ready child micro-operations based on parent micro-operations that issued for execution in the first cycle of the clock and forwards the updated late ready signal to the blocking circuitry; and
      the blocking circuitry blocks from issue at least one picked child micro-operation speculatively identified as ready based on the updated late ready signal.

2. The scheduler of claim 1, further comprising:
   scheduler entry circuitry including a set of scheduler entries for storing micro-operations to be picked by the picker circuitry for issue to execution circuitry; and
   dependency matrix circuitry including a dependency record for each scheduler entry, each dependency record including storage elements for storing information identifying dependencies of micro-operations stored in that scheduler entry on micro-operations in other scheduler entries, wherein:
   for speculatively identifying the child micro-operations as ready, the early wake circuitry:
   receives a late ready signal generated by the late wake circuitry, the late ready signal identifying ready parent micro-operations based on micro-operations that issued for execution in a prior cycle of the clock;
   based on the late ready signal, searches the dependency record to find the child micro-operations whose dependencies are satisfied by the set of ready parent micro-operations; and
   provides, to the picker circuitry, an early ready signal that identifies the child micro-operations.

3. The scheduler of claim 2, further comprising:
   broadcast circuitry including a respective signal line associated each scheduler entry, the broadcast circuitry asserting a signal on a respective signal line for a scheduler entry from where each micro-operation was issued for execution;
   wherein:
   the broadcast circuitry asserts a signal on a respective signal line associated with a scheduler entry for each parent micro-operation issued for execution in the first cycle of the clock; and
   the late wake circuitry generates the updated late ready signal by searching the dependency record based on asserted respective signal lines to find ready child micro-operations whose dependencies are satisfied by parent micro-operations that issued for execution in the first cycle of the clock.

4. The scheduler of claim 1, wherein:
   the late wake circuitry forwards the updated late ready signal to the early wake circuitry to be used for speculatively identifying grandchild micro-operations as ready whose dependencies are satisfied by the ready child micro-operations.

5. The scheduler of claim 1, wherein picked child micro-operations speculatively identified as ready that are blocked from issue are again picked for execution in a subsequent cycle of the clock and permitted to issue to execution units when their parent micro-operations have issued.

6. The scheduler of claim 1, wherein the late wake circuitry permits picked child micro-operations speculatively identified as ready to issue to execution circuitry upon determining that respective parent micro-operations issued to execution circuitry.

7. The scheduler of claim 1, wherein, when picking for issue the at least one of the child micro-operations that are speculatively identified as ready:
   the picker circuitry picks child micro-operations in an age order, with an oldest child micro-operation being picked first.

8. The scheduler of claim 7, further comprising:
   age matrix circuitry that includes an age matrix with information about relative ages of micro-operations stored in scheduler entries, wherein:
   the picker circuitry determines an age order for the child micro-operations based on information in the age matrix.

9. The scheduler of claim 1, further comprising:
   a specified number of execution units for executing micro-operations, wherein:
   when picking for issue to execution circuitry the at least one of the child micro-operations speculatively identified as ready, the picker circuitry picks a maximum of the specified number of the child micro-operations speculatively identified as ready and others of the child micro-operations speculatively identified as ready are not picked.

10. The scheduler of claim 1, wherein a micro-operation is ready when all scheduler entries upon which the micro-operation depends have been picked and issued to the execution circuitry.

11. The scheduler of claim 1, wherein the blocking circuitry blocks from issue the at least one picked child micro-operation speculatively identified as ready by determining, based on the updated late ready signal, that the at least one picked child micro-operation was not ready due to a respective parent micro-operation not having issued to execution circuitry.

12. A method for handling micro-operations in a scheduler in a processor, the method comprising:
   in a first cycle of a clock:
      speculatively identifying child micro-operations as ready whose dependencies are satisfied by a set of ready parent micro-operations which are ready to issue to execution circuitry; and
   in a second cycle of the clock:
      picking at least one of the child micro-operations speculatively identified as ready for issue to execution circuitry;

generating an updated late ready signal that identifies ready child micro-operations based on parent micro-operations that issued for execution in the first cycle of the clock; and blocking from issue at least one picked child micro-operation speculatively identified as ready based on the updated late ready signal.

13. The method of claim 12, wherein speculatively identifying the child micro-operations as ready includes:

receiving a previous late ready signal, the previous late ready signal identifying ready parent micro-operations based on micro-operations that issued for execution in a prior cycle of the clock;

based on the previous late ready signal, searching a dependency matrix to find the child micro-operations whose dependencies are satisfied by the set of ready parent micro-operations; and providing an early ready signal that identifies the child micro-operations.

14. The method of claim 12, further comprising:

using the updated late ready signal for speculatively identifying grandchild micro-operations as ready whose dependencies are satisfied by the ready child micro-operations.

15. The method of claim 12, further comprising:

asserting a signal on a respective signal line associated with a scheduler entry for each parent micro-operation issued for execution in the first cycle of the clock; and generating the updated late ready signal by searching a dependency record based on asserted respective signal lines to find ready child micro-operations whose dependencies are satisfied by parent micro-operations that issued for execution in the first cycle of the clock.

16. The method of claim 12, further comprising:

in a subsequent cycle of the clock, again picking for execution picked child micro-operations speculatively identified as ready that are blocked from issue and permitting the child micro-operations to issue to execution units when their parent micro-operations have issued.

17. The method of claim 12, wherein picking for issue the at least one of the child micro-operations speculatively identified as ready includes:

picking child micro-operations in an age order, with an oldest child micro-operation being picked first.

18. The method of claim 12, further comprising, when picking for issue to execution circuitry the at least one of the child micro-operations speculatively identified as ready:

picking a maximum of a specified number of the child micro-operations speculatively identified as ready, the specified number being equal to a number of execution units; and not picking others of the child micro-operations speculatively identified as ready.

19. A system comprising:

a processor; and a scheduler for the processor, the scheduler configured to:

speculatively identify, in a first cycle of a clock, child micro-operations as ready whose dependencies are satisfied by a set of ready parent micro-operations which are ready to issue to execution circuitry; and in a second cycle of the clock:

pick at least one of the child micro-operations speculatively identified as ready for issue to execution circuitry;

generate an updated late ready signal that identifies ready child micro-operations based on parent micro-operations that issued for execution in the first cycle of the clock; and block from issue at least one picked child micro-operation speculatively identified as ready based on the updated late ready signal.

20. The system of claim 19, wherein the scheduler is further configured to use the updated late ready signal to speculatively identify grandchild micro-operations as ready whose dependencies are satisfied by the ready child micro-operations.

* * * * *